United States Patent [19]

Cowan, Jr. et al.

[11] 4,124,032

[45] Nov. 7, 1978

[54] ADJUSTABLE FEED CLEARANCE MEANS FOR AXIAL FLOW TYPE COMBINE

[75] Inventors: Everett C. Cowan, Jr., Parksburg; Edwin O. Margerum, Paradise, both of Pa.

[73] Assignee: Sperry Rand Corporation, New Holland, Pa.

[21] Appl. No.: 825,332

[22] Filed: Aug. 17, 1977

[51] Int. Cl.² .................................... A01F 12/20
[52] U.S. Cl. ................................ 130/27 T; 56/14.6
[58] Field of Search ................ 130/27 R, 27 L, 27 T; 56/14.5, 14.6

[56] References Cited

U.S. PATENT DOCUMENTS

| 3,631,862 | 1/1972 | Rowland-Hill | 130/27 L |
| 3,734,103 | 5/1973 | Mathews | 130/27 L |
| 3,871,384 | 3/1975 | DePauw et al. | 130/27 T |
| 3,949,761 | 4/1976 | Mortier et al. | 130/27 L |
| 3,982,549 | 9/1976 | DePauw et al. | 130/27 T |

Primary Examiner—Russell R. Kinsey
Attorney, Agent, or Firm—Frank A. Seemar; John B. Mitchell; Ralph D'Alessandro

[57] ABSTRACT

An axial flow type combine having a rotor provided with rasp bars operable relative to a concave to form a threshing region and provided at the inlet end of the threshing region with support means for the rotor adjustable to vary the distance between the rotor and concave. In the preferred construction of said support means, the forward end of the shaft of the rotor is mounted for movement toward and away from the inner surface of the concave.

10 Claims, 3 Drawing Figures

ADJUSTABLE FEED CLEARANCE MEANS FOR AXIAL FLOW TYPE COMBINE

BACKGROUND OF THE INVENTION

The present invention pertains to axial flow type combines in which the threshing and separating mechanism extends substantially longitudinally in the combine to the direction of travel and, essentially, comprises a rotor rotatably mounted in a casing having a threshing concave disposed in the lower portion thereof, and a separation grate rearward of said concave. In operation, crop material is fed to the forward or inlet end of the concave and rotor to a space therebetween which comprises a threshing region. In this region, the crop material is conveyed spirally as it moves axially rearwardly therethrough to effect separation of the grain from the crop material and deliver the waste material usually to the rearward end of the combine for discharge therefrom onto the field.

In normal practice, there is a relatively small clearance between the rotor and the casing which causes difficulties incident to introducing the material into the casing. Accordingly, one effective solution for increasing the feeding capacity employs auger means on the forward end of the rotor to aggressively transfer crop material from the crop elevator of the combine to the inlet end of the threshing and separating mechanism for treatment of the same within the threshing region.

Various other problems have been encountered in the past during efforts to provide efficient crop handling units for use in all types of crop material and in varying field and climatic conditions. For example, variable spacing between the rotor and concave has been contemplated for the purpose of alleviating plugging at the inlet end of the threshing region of axial flow type combines. Devices of this nature are shown in U.S. Pat. No. 3,631,862 issued to E. W. Rowland-Hill et al on Jan. 4, 1972, and U.S. Pat. No. 3,949,761 issued to F. H. Mortier et al on Apr. 13, 1976. These patents show unique structure directed to mechanisms for adjusting the position of a concave in an axial flow type combine to improve crop handling in the threshing region.

It is generally recognized that an important aspect of the operation of any combine harvester is the need for optimum threshing and separating characteristics along with a minimum amount of required adjustments regardless of the type of crop being handled. To this end, the effectiveness of an axial flow type combine can be improved if spacing between the concave and rasp bars is changed to accommodate varying types of crop having different characteristics, e.g., grain size. The structure shown in the patents mentioned above, although not addressed to the specific problem of accommodating various type crops, can be utilized to accomplish that end.

From the foregoing, and to summarize, it will be seen that previous attempts to alleviate plugging problems have resulted in the development of certain structures such as that shown in the mentioned patents. However, the present invention provides variable spacing means which are different from the means in the aforementioned patents for reasons set forth hereinafter and details thereof are as follows.

SUMMARY OF THE INVENTION

It is one of the principal objects of the present invention in the threshing region of a combine means to adjust the forward end of the threshing rotor relative to the forward end of the combine with which it cooperates, while the rear end of the axis of the rotor remains substantially stationary.

Another object of the invention is to provide in said means to adjust the forward end of the rotor a transverse plate or member which preferably extends across the full width of the inlet end of the threshing region, said member having a bearing which rotatably supports the forward end of the shaft of the threshing rotor, and means are connected to the transverse supporting member for purposes of raising opposite ends of the same equal distances either upwardly or downwardly, depending upon the amount of adjustment desired to be effected between the forward end of the rotor and concave, especially to provide a varying amount of space at the inlet end of the threshing region, whereby varying types of crop material will be readily accommodated at the threshing region.

Further object of the invention is to provide a relatively simple but effective means to obtain the desired adjustment in the space between the inlet ends of the rotor and concave for the aforementioned purposes, said adjustment means comprising a shaft extending transversely across the inlet end of the threshing region above and parallel to the transverse member which is to be adjusted thereby, said shaft having similar crank arms of limited length respectively supported adjacent opposite ends of said shaft, and links connect the outer ends of said crank arms respectively to opposite ends of the transverse member, whereby limited rotation of said shaft will effect movement of the transverse member toward and from the inlet end of the concave and correspondingly, move the inlet end of the rotor with respect to the concave.

Still another object of the invention is to provide an operating handle connected to such shaft and extending radially therefrom, said handle being maintained in a desired position of adjustment by means fixed relative to the casing of the combine and latching mechanism on the handle engageable with the fixed position maintaining means.

A still further object of the invention is to provide guide means for the opposite ends of said transverse member, preferably in the form of slots extending transversely to the longitudinal axis of said member, and bolts extend through said slots for threaded engagement with threaded holes disposed at fixed locations relative to the casing of the combine, whereby said bolts not only afford guide means for the transverse member during movement thereof but, in addition, said bolts may be tightened following the effecting of a desired position of adjustment for the space between the rotor and concave at the inlet end thereof in order to releasably secure the forward end of said rotor in said adjusted position thereof.

Still another object of the invention is to provide drive means for the rotor adjacent the rear end of the shaft thereof, said drive means being actuated by power means otherwise provided in the combine, and a flexible coupling is disposed between said drive means and the rearward end of the rotor to compensate for the rearrangement of the forward end of the rotor with respect to the forward end of the concave.

Details of the foregoing objects and of the invention, as well as other objects thereof are set forth in the following specification and illustrated in the accompanying drawings comprising a part thereof.

DETAILED DESCRIPTION

Figure 1:
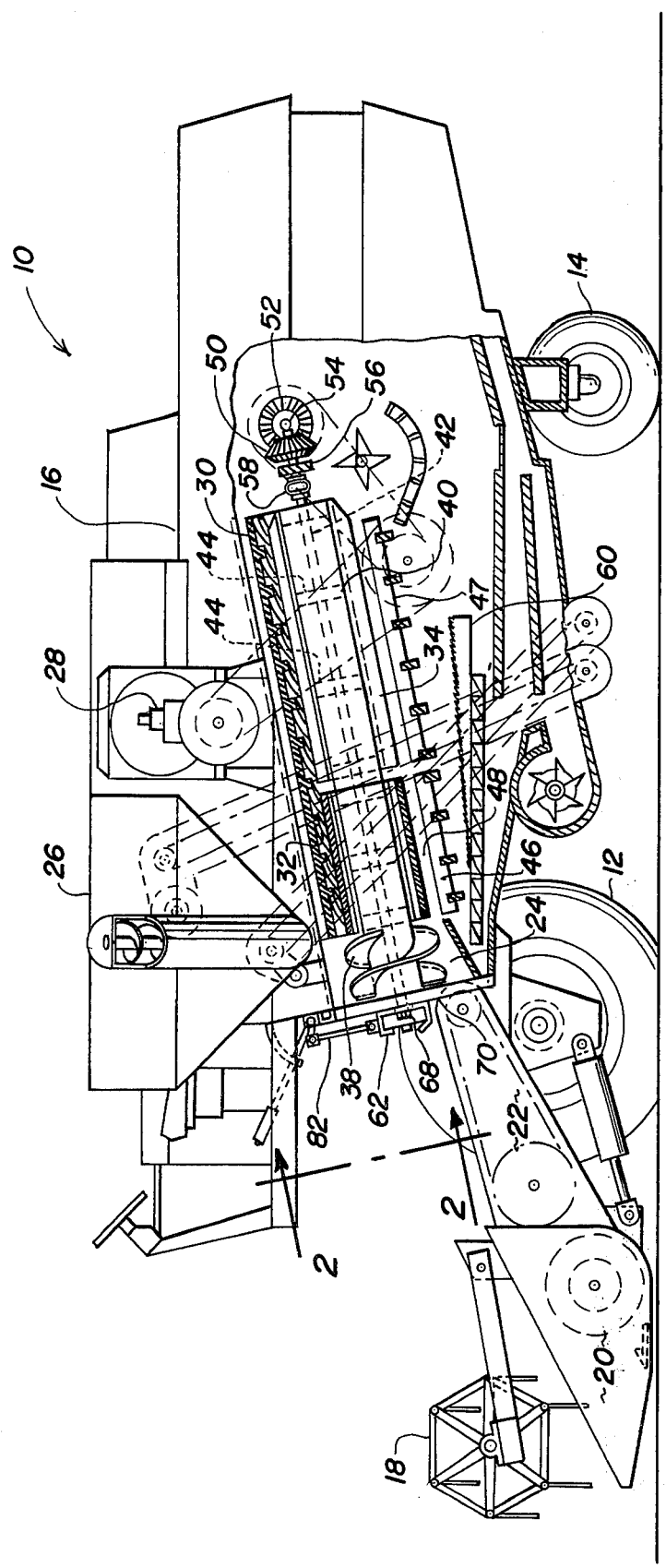
FIG. 1 is a side elevation of an exemplary type combine to which the present invention is applicable, the central portion of the combine being broken away to show details of the region thereof with which the present invention is concerned.

Referring to FIG. 1, it will be seen that the present invention is applicable to the combine 10 of the mobile type, having large diameter forward wheels 12 and smaller diameter supporting and guide wheels 14. Said wheels support a basic frame upon which a casing 16 is mounted. At the forward end of the combine, a rotary reel 18 of conventional type is mounted adjustably with respect to a header 20 and the grain or other agricultural crop which is cut by the header 20 is moved from the header by conventional means into elevator structure 22 which encloses normal conventional belts or other means for delivering cut crop material which is to be threshed upwardly and rearwardly for introduction to the auger compartment 24. The threshed grain is delivered by a suitable additional elevating means to the accumulating hopper 26. Power for the various moving parts of the combine as well as the drive means therefor, are afforded by an engine 28.

The present invention primarily is concerned with the threshing mechanism of the combine which includes a substantially cylindrical casing 30 within the upper portion of which a series of arcuate ribs 32 are formed which are of a generally spiralling nature for purposes of insuring feed of the crop material being threshed from the forward end toward the rearward, discharging end of the threshing compartment of the combine. Rotatable within the casing 30 is a rotor 34 which, for example, may be generally of the type shown in detail in prior U.S. Pat. No. 3,995,645, said rotor having at least a pair of rasp bars 36, which extend longitudinally of the rotor.

Figure 2:
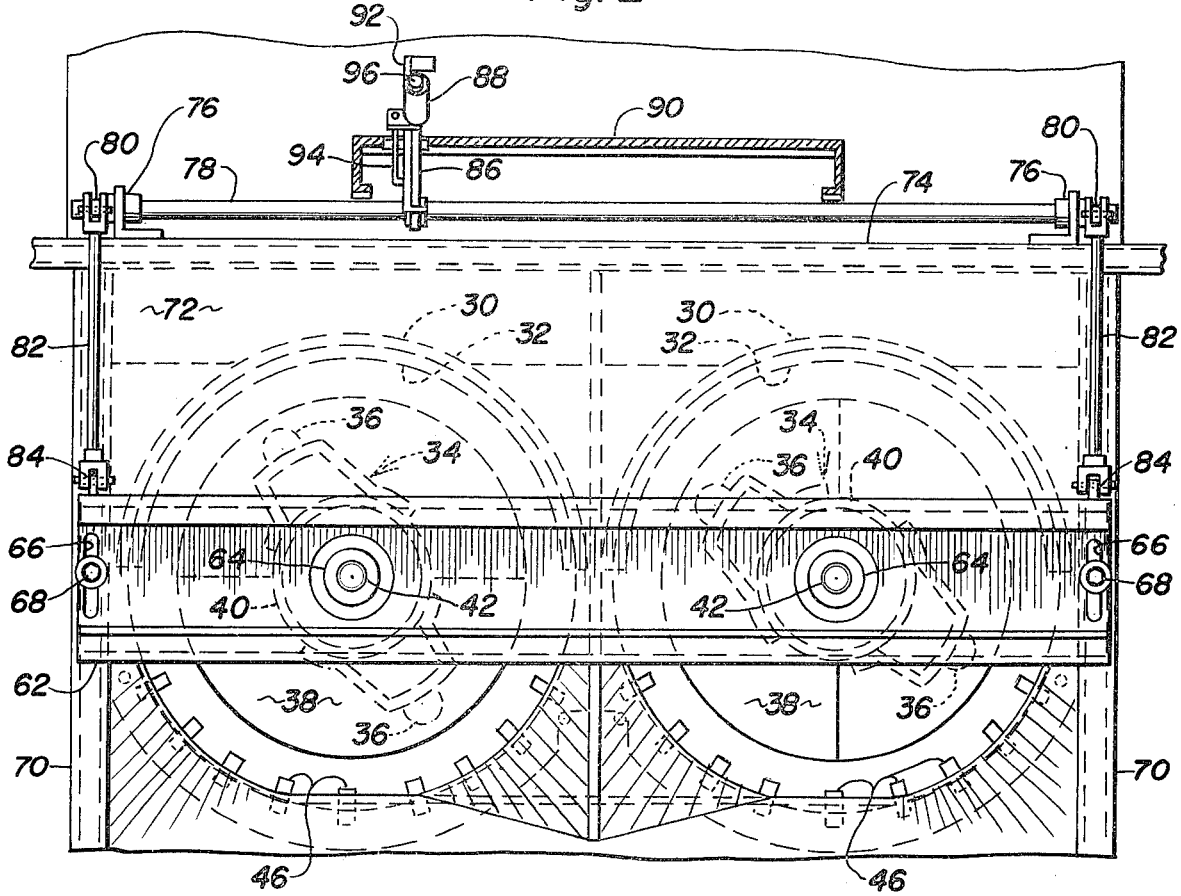
FIG. 2 is a fragmentary, enlarged front elevation of the adjustable means of the present invention, substantially as seen from the line 2—2 of FIG. 1.

As seen in FIG. 2, the combine which has been selected for purposes of illustrating and describing the present invention is of the double rotor type. In such construction, the respective rotors rotate in opposite directions as indicated by the direction arrows shown in exemplary manner in FIG. 2, but for purposes of the present invention, a description of a single rotor and threshing compartment which it comprises part of will suffice. Further, referring to FIG. 1, it will be seen that the combine selected for such description also includes a spiral auger 38 mounted upon the forward end of the base cylinder 40 of the rotor 34, said cylinder having a supporting and drive shaft 42 extending axially thereof and a series of longitudinally spaced connecting discs 44 connect the shaft 42 with the base cylinder 40.

In combines of the type basically shown in FIG. 1, the present invention provides adjustment of the axis of the rotor relative to the arcuate concave 46 between which a threshing region 48 is formed. The drive shaft 42 of each rotor 34 is driven by suitable heavy-duty means such as a bevel gear 50 connected to the rearward end of each drive shaft and a driving bevel gear 52 is fixed to a transverse power shaft 54 which, by suitable means not shown, is energized by the engine 28 and suitable clutch means and the like, also not shown. The portion of the drive shaft of each rotor which is connected to the bevel gear 50 is supported by a transverse plate 56 shown in FIG. 1 and immediately adjacent said plate, which has appropriate bearing means therein, is a flexible coupling 58, which is for purposes to be described.

In accordance with the principles of the present invention, a concave 46 for each of the rotors 34 preferably is fixedly supported with respect to the lower portion of the cylindrical casing 30. Also, in the preferred construction, a separator grate 47 for each rotor is likewise fixedly mounted for the purpose of effecting different types of discharge of threshed or partially threshed material which falls through the openings of the separator grate onto the grain pan 60 for separation of the desired crop material from the waste. Similarly, the rotor 34 may have two different sections as shown in exemplary manner in FIG. 1, one of the same being illustrated in vertically sectioned manner and said rotor sections may have different characteristics, if desired.

Figure 3:
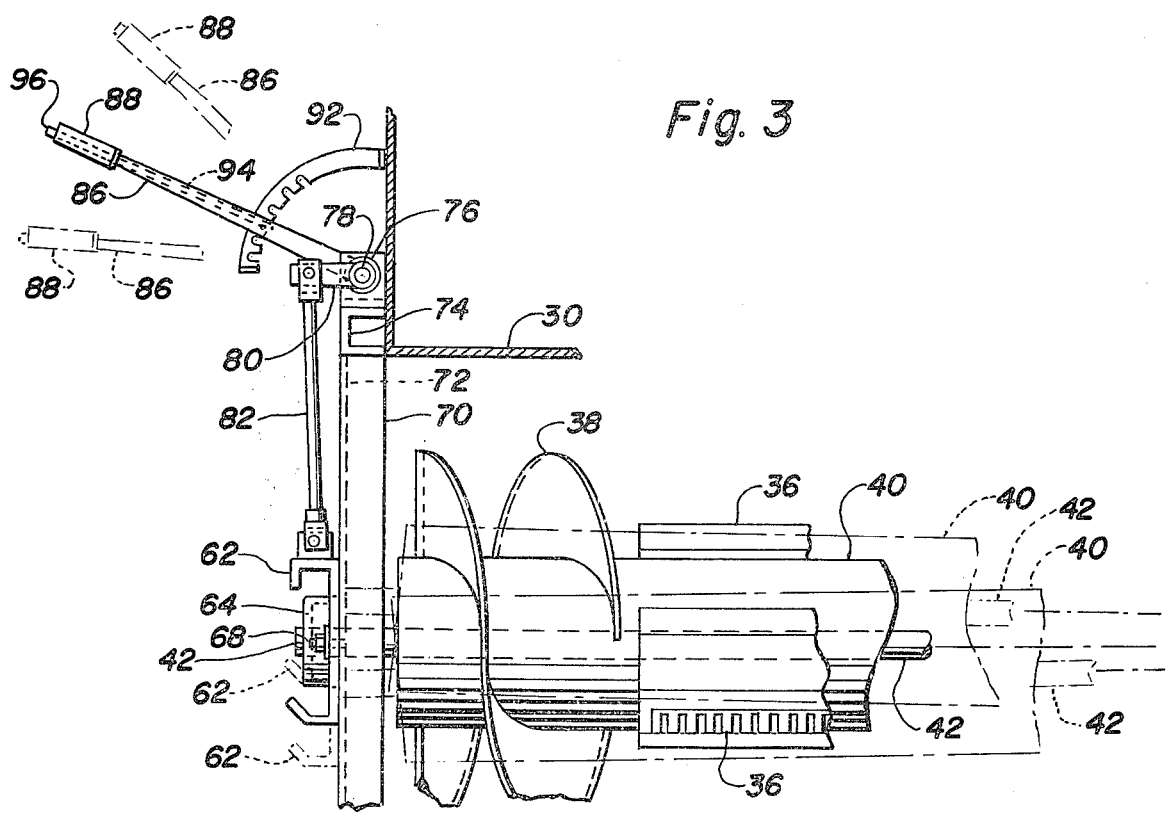
FIG. 3 is a fragmentary side elevation of the portion of the combine shown in FIG. 2 as seen on the line 3—3 thereof.

In accordance with the principal objective of the present invention, it is desired that because varying types of crop material are fed by the auger 38 to the inlet end of the threshing compartment 48 which is defined by the inner curved surface of concaves 46 and the rotors 34, it is preferred to have means to vary the distance between the inner surfaces of the concaves of the one or more threshing compartments, and the rotors, especially the path described by the rotation of the rasp bars upon said rotors. The means to effect the variable spacing between the rotor and concave structure at the inlet end of the threshing compartment 48 comprises the mechanism shown particularly in detail in FIGS. 2 and 3. The principal element of said mechanism comprises a transverse member 62 which preferably is somewhat channel-shaped as seen in FIG. 3 for purposes of rendering the same rigid. Said member is provided at suitable locations with one or more bearings 64, depending upon the number of rotors embodied in the combine. Said bearings support the forward ends of the drive shafts 42. Formed in the opposite ends of the member 62 are a pair of slots 66 comprising part of the guide and supporting means for the member 62. A guide and clamping bolt 68 extends through each slot 66 for threaded engagement with, for example, upright members 70 which comprises part of the casing 16.

Extending upward from the upper portion of cylindrical casing 30 is a vertical front wall 72 which is clearly shown in FIGS. 2 and 3. Adjacent the upper end of the upright members 70 and abutting front wall 72 is a transverse frame member 74. A plurality of bearing blocks 76 are supported upon the transverse member 74 for purposes of supporting a transverse shaft 78, which preferably extends between the opposite upright members 70. Fixed to each outer end portion of shaft 78 is a short crank arm 80. Pivotally connected to the outer end of each crank arm 80 is a depending link 82, the lower end of which has a clevis thereon which is pivotally connected to a lug 84 of which there are two, respectively connected to the opposite ends of the transverse member 62.

Mounted intermediately of the ends of the shafts 78 and fixed at one end thereto is an operating lever 86 having on the outer end thereof a manually engageable handle 88. Said handle preferably is mounted adjacent the platform 90, see FIG. 2, upon which the operator of the combine sits.

Position maintaining means for the lever 86 are provided in the form of an arcuate bracket 92, which is fixed at one end, for example, to the front wall 72. A latch or locking detent is formed on one end of a rod 94 which is movable along the operating lever 86 and the spring-pressed button 96 is mounted on the outer end of rod 94 for manual engagement by the operator of the combine. Such position maintaining means is similar to latching means employed in a number of different types of agricultural machinery and the same operates quite satisfactorily for the present invention. As seen in FIG. 3, a number of adjusted positions of the lever 86 are shown respectively to correspond with various adjusted positions of the rotor 34 with respect to the fixed concave 46. Such various positions of adjustment of the rotor 34 are shown in full lines and phantom in several exemplary positions shown in said figure and it will be understood that the auger 38 likewise will be moved to corresponding adjusted positions but in order to simplify the view, such adjusted positions of the auger 38 have been omitted.

From the foregoing, it will be seen that the vertically movable transverse member 62 is relatively simple and affords sturdy and effective means for adjustably moving, as well as supporting, the forward ends of the shafts 42 of the one or more rotors embodied in the exemplary combine described hereinabove and illustrated in the accompanying drawings. Movement of the same to any one of a number of adjusted positions readily is effected by manipulation of the operating lever 86 and after such adjustment has been made, it may be releasably maintained in said position by tightening the bolts 68 which supplement the latching means on rod 94 which engages a selected notch, for example, in the arcuate bracket 92.

It will be understood that the present invention permits adjustment of the inlet end of the threshing region to be varied to suit the operation of the harvester or combine to the particular type of crop material on any particular day or portion of a day. Normally, it will not be necessary for the combine operator to effect adjustment of the rotors with respect to the concave at frequent intervals, but, even if this is required, the invention is capable of having such adjustments made with relative ease and even while the combine is operating, especially if the bolts 68 are loosened sufficiently that they merely serve as guide means rather than clamping means.

Also in view of the employment of flexible coupling means 58 adjacent the rearward end of the rotors, any tendency to resist the effecting of adjustment of the forward ends of the rotors with respect to the concave is eliminated, without placing strain upon the drive shaft or the driving mechanism.

The foregoing description illustrates preferred embodiments of this invention. However, the concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. An axial flow type combine provided with:
   a. a casing having an infeed end arranged to receive crop material to be threshed in a substantially axial direction,
   b. a rotor extending generally axially in said casing rearwardly from the infeed end thereof and having rasp bars extending therealong, and
   c. a concave supported within said casing and extending at least partially along the lower surface portion of said casing for cooperation with the rasp bars on said rotor to form a threshing region in which crop material is threshed, said concave having an inlet end adjacent the infeed end of said casing, the improvement comprising in combination therewith;
   d. means to provide variable spacing between said rasp bars and said concave adjacent the inlet end of said threshing region to facilitate the accommodation of varying crop material fed to said region, said means including support means for the forward ends of said rotor operable to change the normal distance between said rotor and said concave and thereby afford optimum threshing in the operation of said region regardless of the type of crop material.

2. The combine according to claim 1 in which the support means for the forward end of said rotor is movable toward and from the inner surface of said concave.

3. The combine according to claim 2 in which said support means comprises a transverse member extending across the forward end of said rotor, means on the infeed end of said casing supporting said member for adjustable vertical movement, bearing means in said transverse member, and said rotor having a central shaft supported at the forward end thereof by said bearing means, and means connected to said transverse member operable to move the same to change the distance of the forward end of said rotor from the forward end of said concave as aforesaid.

4. The combine according to claim 3 further including guide means on said infeed end of said casing operable to guide the opposite ends of said transverse member.

5. The combine according to claim 3 in which said means to move said transverse member is arranged to move the opposite ends of said member even distances in the same direction.

6. The combine according to claim 5 in which said means to move said transverse member comprises a horizontal shaft parallel to said member, similar crank arms extending from opposite ends of said shaft in similar directions, means connecting the opposite ends of said transverse member to said crank arms, and means on said shaft operable to rotate the same selectively in opposite directions respectively to raise or lower said member to effect the adjustable spacing of said rotor relative to said combine as aforesaid.

7. The combine according to claim 6 in which said means to rotate said transverse bar comprises a manually engageable lever fixed at one end to said shaft and the outer end having a handle thereon, and position maintaining means fixed relative to said casing and including latching means carried by said lever and engageable with said position maintaining means at selected locations to secure said transverse member at a desired level relative to the forward end of said concave.

8. The combine according to claim 6 in which the opposite ends of said transverse member are provided with means adapted to guide said ends in movements transverse to the axis of said member.

9. The combine according to claim 8 in which said guide means comprise slots in the opposite ends of said transverse member extending in the directions of adjustable movement thereof, and bolts extending through said slots for support in fixed positions upon said casing of said combine, said bolts when tightened against said transverse member being operable to releasably secure said member and the end of the rotor supported thereby in a desired adjusted position for the inlet end of the threshing region.

10. The combine according to claim 3 in which the rearward end of said central shaft of said rotor has means to connect it to power means in said combine, and said shaft being provided with a flexible coupling at said rearward end thereof to compensate for said adjustment of the forward end of said rotor.

* * * * *